US007987202B2

(12) United States Patent
Noll et al.

(10) Patent No.: US 7,987,202 B2
(45) Date of Patent: Jul. 26, 2011

(54) CONTEMPORANEOUSLY SHARING RESOURCES TARGETED BY A LIBRARY

(75) Inventors: Lindsey R. Noll, Seattle, WA (US); Steve Seixeiro, Snohomish, WA (US); Ramkumar Ramasubramanian, Bellevue, WA (US); Relja B. Ivanovic, Seattle, WA (US); Jerry K. Koh, Bothell, WA (US); Gurjot S. Brar, Renton, WA (US); Anshul Rawat, Kirkland, WA (US); Lyon Wong, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 471 days.

(21) Appl. No.: 12/146,207

(22) Filed: Jun. 25, 2008

(65) Prior Publication Data

US 2009/0327221 A1 Dec. 31, 2009

(51) Int. Cl.
*G06F 7/00* (2006.01)
*G06F 17/30* (2006.01)

(52) U.S. Cl. ......... 707/792; 707/796; 707/805; 707/812

(58) Field of Classification Search .................. 707/694, 707/792, 796, 802, 805, 812
See application file for complete search history.

(56) References Cited

U.S. PATENT DOCUMENTS

| | | | |
|---|---|---|---|
| 6,012,068 A | 1/2000 | Boezeman | |
| 6,216,140 B1 | 4/2001 | Kramer | |
| 6,715,031 B2* | 3/2004 | Camble et al. | 711/111 |
| 7,162,488 B2 | 1/2007 | DeVorchik | |
| 7,213,029 B2* | 5/2007 | Nelson et al. | 707/648 |
| 7,275,063 B2 | 9/2007 | Horn | |
| 7,730,030 B1* | 6/2010 | Xu | 707/617 |
| 2004/0193673 A1 | 9/2004 | Samji | |
| 2006/0053389 A1 | 3/2006 | Michelman | |
| 2006/0073812 A1 | 4/2006 | Punaganti Venkata | |
| 2006/0277461 A1* | 12/2006 | Britt et al. | 715/513 |
| 2006/0277498 A1* | 12/2006 | Mann et al. | 715/825 |
| 2007/0112835 A1* | 5/2007 | McMullen et al. | 707/102 |
| 2007/0143252 A1 | 6/2007 | Toorn | |
| 2007/0233647 A1 | 10/2007 | Rawat | |
| 2008/0065721 A1 | 3/2008 | Cragun | |

OTHER PUBLICATIONS (Setorie, Koi—Presenter), Dec. 11, 2006; "Momentum Webcast Reporting," Webcast—http://whitepapers. zdnet.co.uk/1,1000000651,260272930p,00.htm.
Simonds, Lauren; Apr. 11, 2008; Web publication, "HP Joins the Online Backup and Collaboration Parade,"—http://itmanagement.earthweb.com/datbus/article.php/3739921.

* cited by examiner

*Primary Examiner* — Don Wong
*Assistant Examiner* — Merilyn P Nguyen
(74) *Attorney, Agent, or Firm* — Shook Hardy & Bacon, L.L.P.

(57) ABSTRACT

Computer-readable media, computerized methods, and computer systems for acting on properties of multiple resources, which span disparate locations within a network, upon detecting an intuitive user-initiated operation are provided. Initially, a library is provided that includes a framework for contemporaneously accessing a collection of items within a scope thereof. Upon launching the library, representations of the scoped items are surfaced at a UI display. When the user-initiated operation is applied at one of the surfaced representations, properties of each of the scoped items are automatically manipulated. A library-configuration state, which reflects how the items are affected upon manipulating the properties thereof, may be updated upon implementing the manipulation. Accordingly, if the scope of the library is subsequently extended to encompass another item outside the original collection of items, the properties of this new item are automatically manipulated to align with the library-configuration state.

19 Claims, 10 Drawing Sheets

CONTEMPORANEOUSLY SHARING RESOURCES TARGETED BY A LIBRARY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Generally, individual resources are established and stored in separate locations in order to organize information based on projects, to apply differing levels of security to various folders/files, and the like. Various techniques exist that enable a user to share the individual resources (e.g., files, folders, network paths, and the like) with one or more other users, such as granting another user permission to access or edit a document. However, these current techniques require the user attempting to share the individual files or the individual folders to separately locate each of the individual files/folders and manipulate the properties thereof to reflect the user's intent to share. For instance, the user must recursively access each location at which the individual files/folders are stored, traverse a directory within each accessed location to arrive upon an object linked to an individual file, and act upon the properties of that file. As such, this technique fails to offer a convenient vehicle for collectively sharing two or more files concurrently, and presents a tedious and time-consuming task for users wishing to share multiple files at a variety of locations (e.g., sharing exchanging business information on a plurality of servers with business partners).

Accordingly, employing a procedure to that allows a user to collectively operate on multiple resources, which span disparate locations, in a contemporaneous manner would uniquely streamline the management of a user's data, and, in particular, would enhance the user's experience when sharing that information with other users.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to computer-readable media, computerized methods, and computer systems for acting on properties of multiple resources that span disparate locations within a network upon providing an intuitive user-initiated operation at an item. Initially, a library may be provided that encompasses a collection of items which are mapped thereto. Accordingly, the library embodies a framework for allowing a user to contemporaneously access a plurality of items, or resources, which are stored at various locations within a scope of the library, upon launching the library. By way of example, the various locations traverse disparate devices, portions of hardware, and/or platforms within a network. Upon launching the library, representations of the scoped resources are surfaced at a UI display. In embodiments, the representations may be rendered as a collective view in a hierarchical format, that is intuitively navigable and searchable for an individual resource.

When a user-initiated operation is applied at one of the surfaced representations, the properties of one or more scoped resources are contemporaneously manipulated in accordance with the user-initiated operation. A library-configuration state, which reflects effects to the resources upon manipulating the properties thereof, may be updated upon implementing the manipulation. Accordingly, if the scope of the library is subsequently extended to encompass a subject resource outside the library's scope, the properties of the subject resource are automatically manipulated to correspond with the library-configuration state. A message that notifies the user of a successful manipulation may be rendered at the UI display. Or, a communication that alerts users affected by the manipulation may be published at a network.

In an exemplary instance, let there be a musician that has recorded and saved a plurality of digital audio files to various locations including a local storage and a CD drive on a personal computer, a remote server available on the Internet, and another computing device available via a home intranet. These files residing on one or more of the various locations can be assigned to a particular library, thereby providing the musician concurrent access to this collection of files upon launching the library. If the musician decides to share the files as a collection, a single-click operation may be applied to a representation of one of the files or to the library itself to initiate an adjustment of interactive rights to the collection. In instances, a group of files within the collection may be selected for sharing, and/or specific users may be selected as sharees when adjusting the interactive rights. Upon completing the adjustment, a message may be sent to alert the sharees that the digital audio files are shared with them, while a message may appear to the musician providing notice that the files were successfully shared.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Accordingly, in one embodiment, the present invention relates to computer-executable instructions, embodied on one or more computer-readable media, that perform a method for automatically manipulating properties of resources residing at one or more locations targeted by a library. As used herein, the term "resources" is not meant to be limiting, but may include any type of file path, file, folder, document, media file, stored item, information object, links, lists, and/or other storage elements regardless of the physical location of their source.

In particular, the method includes, inter alia, receiving a user-initiated operation to launch a library. Typically, the library comprises a framework for contemporaneously accessing the resources of the one or more targeted locations within a scope of the library. Upon launching the library, representations of these resources may be surfaced at a UI display. When a user-initiated action is applied to one of the surfaced representations, the properties of each of the resources residing at the one or more targeted locations within the scope of the library are automatically manipulated, in accordance with the user-initiated action. These resources may be stored, at least temporarily, consistently with the manipulated properties.

Generally, storing the resources includes updating a library-configuration state that reflects how the resources are affected upon manipulating the properties thereof. Accordingly, when the scope of the library is extended to encompass a subject resource residing within an untargeted location, the properties of the subject resource are automatically manipulating to align with the library-configuration state, wherein the library-configuration state of the subject resource is consistent with a latest manipulation applied to the resources originally provided within the scope of the library. Upon manipulating the properties of the resources, a notice that exposes the updated library-configuration state of the resources may be published.

In another embodiment, aspects of the present invention involve a computerized method, implemented at a computing device, for contemporaneously adjusting interactive rights of one or more resources. Initially, the method includes detecting a single user-initiated operation applied to a representation of an item. Typically, the item includes a location or the one or more resources residing at the location that is encompassed within a scope of a library. The library generally comprises a framework for contemporaneously accessing and acting on the one or more scoped resources. Further, the method may include, inter alia, the following steps, in now particular order: employing the framework of the library to identify system paths to each of the scoped resources; based on the system paths, filtering from consideration as candidates for adjustment the scoped resources that reside at remote locations; and contemporaneously adjusting the interactive rights of the candidate scoped resources. A library-configuration state that articulates the adjusted interactive rights of the scoped resources may be generated. This library-configuration state is often published to a network. In addition, a status of the shared scoped resources is communicated to a set of users whose interactive rights to the scoped resources are adjusted.

In yet another embodiment, the present invention encompasses a computer system embodied on one or more computer storage-media having computer-executable instructions provided thereon for performing a method for simultaneously manipulating interactive rights of one or more resources residing at a plurality of locations targeted by a library. Initially, the computer system includes, inter alia, the plurality of target locations on which the one or more resources reside and a processor component. Typically, at least one of the target locations is mapped to local physical location and at least one of the target locations is mapped to a remote physical location.

The processor component, which accommodates an operating system for contemporaneously accessing the resources being accessed by the library, includes a sharing engine, a data store, a translation component, and an operation component. The sharing engine executes a handler scheme for calling the plurality of target locations within a scope of the library upon launching the library. Generally, the launch of the library is invoked by a single user-initiated operation applied to a representation of the library at a UI display. The data store receives the calls from the handler scheme, interprets the calls to identify the plurality of target locations at the local physical location that are identified thereby, and generates a manifest of system paths. In embodiments, the system paths point to the resources residing within the identified plurality of target locations.

The translation component receives the calls from the handler scheme, interprets the calls to identify the plurality of target locations at the remote physical location that are identified thereby, and translates a list of the one or more resources residing at the identified plurality of target locations into the manifest of system paths. In response to a user-initiated operation applied to the library, the operation component simultaneously manipulates the interactive rights of the resources by tracing the system paths thereto. In embodiments, the operating system further includes a filtration component that filters the system paths from the manifest upon ascertaining that the plurality of target locations is currently unavailable to the sharing engine. Generally, the filtered system paths point to resources residing at the unavailable target locations.

In embodiments, the present invention facilitates sharing multiple locations through a pre-established vehicle for contemporaneously accessing multiple locations. In one instance the vehicle is a library. As used herein, the term "library" is not meant to be limiting and may encompass any destinations in which a user may find and/or organize data as a collection of items. Advantageously, the collection of items, or resources that comprise content, may span multiple locations. In one instance, a library may ostensibly function as folder that provides access to many resources. However, unlike a folder, the library provides one-click access to resources in various folders, or locations, on various platforms.

In an exemplary embodiment, the library is configured to provide access to locations within a scope of that particular library. These scoped locations may be local or remote, and may be automatically assembled by an operating system, or may be manually established and managed by a user or administrator. Manually establishing the scoped locations may include discovering one or more locations (e.g., federated sources or non-federated devices), ascertaining that the locations are relevant to the library, and selecting the locations for addition to the library. Based on modifications to resources within the scoped and non-scoped locations, the library may be managed by removing or adding locations to maintain a useful collection of items. Accordingly, although a user's varied storage patterns may have resulted in the creation of dispersed files and folders, the libraries allow a user to consolidate access to these entities via a robust interface.

In particular, the interface may be provided in the form of a top view. The top view, or navigation pane, typically enumerates a selection of the resources within the library's scoped locations. The order and hierarchical level of the selected resources that are initially exposed may be determined by an underlying configuration of the library or by user preferences. In an exemplary embodiment, the configuration of the exposed resources substantially simulates conventional arrangements of files and folders presented at a UI display. Thus, libraries facilitate working across multiple locations (e.g., locations beyond a local personal computer) within a single view.

For instance, let there be a sales representative who is searching for a sales report within various files on disparate computing devices (e.g., across the internet, the corporate intranet, on the local PC, and the like) or on separate platforms within a single computing device. Launching a library that encompasses sales information for that particular sales representative may expose an aggregation of the various files that may potentially include the sales report. If an indication of the sales report is not surfaced upon initially launching the library, the sales representative may navigate through a file hierarchy of the library, or perform a library-wide search. The library-wide search typically accesses each of the files within the scope of the library and searches each for the sales report, assuming arguendo that the computing devices, and the data stores therein, are in communication with a sharing engine supporting the library. Accordingly, the single view effectively dissolves the location boundaries of where data is stored, and enables a user to work with items in the library in a logical and natural way.

Although various different configurations of the library have been described (e.g., an aggregation of resources across scoped locations), it should be understood and appreciated by those of ordinary skill in the art that other types of vehicles that provide suitable "collections of items" may be used, and that embodiments of the present invention are not limited to those library architectures described herein. By way of example, collections of items may be consolidated by, and mapped to, a set of search-based query results, a list of favorite destinations, and the like. These vehicles may provide simultaneous access to files that traverse multiple devices/memory locations, and, for the purposes of discussion are considered embodiments of libraries.

Having briefly described an overview of embodiments of the present invention and some of the features therein, an exemplary operating environment suitable for implementing the present invention is described below.

Figure 1:
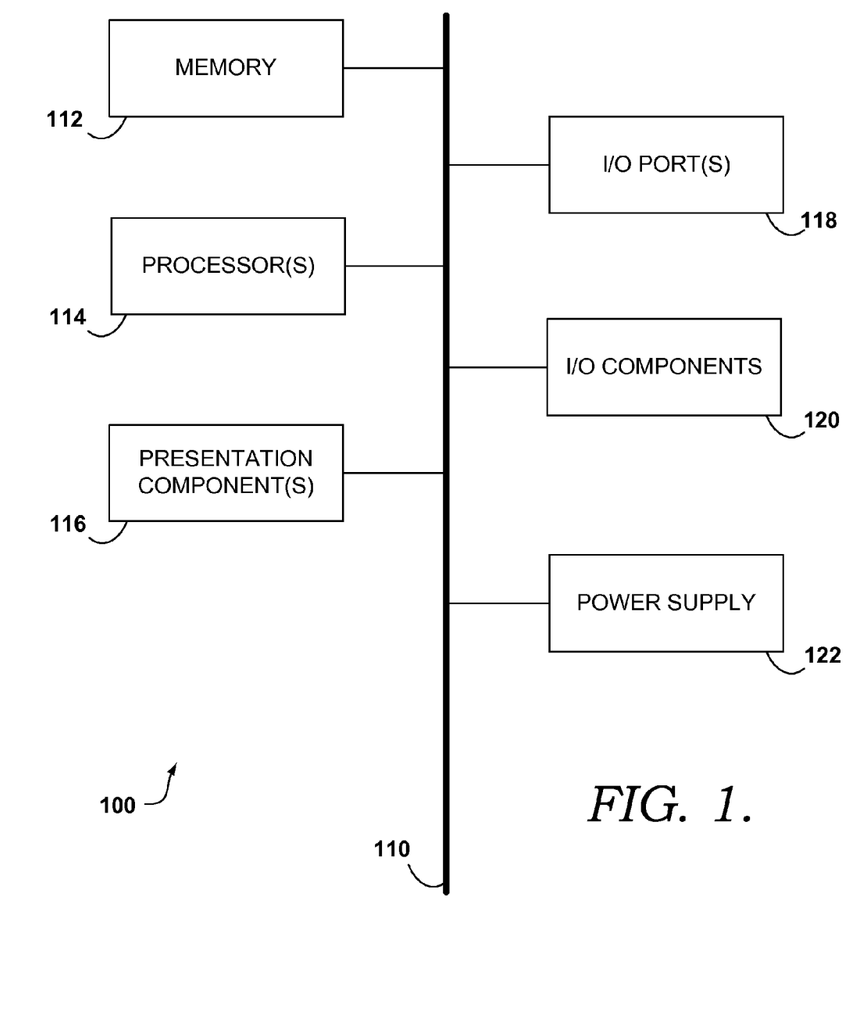
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
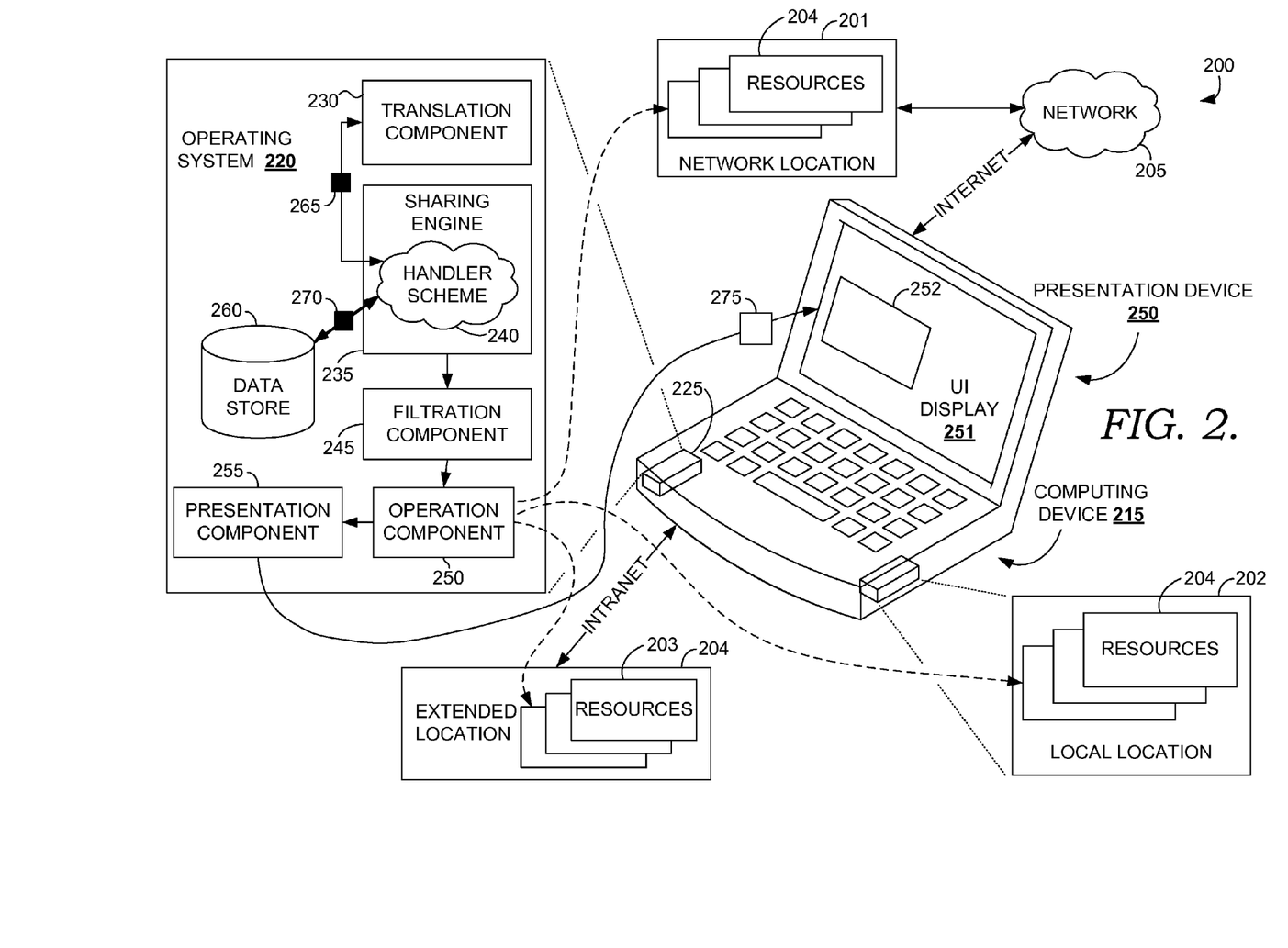
FIG. 2 is a schematic diagram of an exemplary system architecture suitable for use in implementing embodiments of the present invention, in accordance with an embodiment of the present invention.

Turning now to FIG. 2, a schematic diagram of an exemplary system architecture 200 suitable for use in implementing embodiments of the present invention is shown, in accordance with an embodiment of the present invention It will be understood and appreciated by those of ordinary skill in the art that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

Further, logic within the operating system 220 supporting the exemplary system architecture 200 may be embodied on an internal processing component 225 to a computing device 215. This logic assists the operating system 220 in interfacing with local and remote destinations provided within a distributed computing environment, such as a remote server (e.g., network location 201 or extended location 203), or any combination thereof. In embodiments of the invention that are practiced in distributed computing environments, logic communication is linked through appropriate connections. These connections may be wired or wireless.

Examples of particular wired embodiments, within the scope of the present invention, include USB connections and cable connections. Examples of particular wireless embodiments, within the scope of the present invention, include a near-range wireless network and radio-frequency technology. It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.). Therefore it is emphasized that embodiments of the connections between the computing device 215 and the remote server(s), for instance, are not limited by the examples described, but embrace a wide variety of methods of communications.

For instance, the computing device 215 may be operably coupled to a network location 201 that employs internet technologies over a network 205. In another instance, the computing device 215 may be operably coupled to an extended location 203 that employs intranet technologies over a private computer network (e.g., securely sharing part of an organization's information). In embodiments, these operable connections include, without limitation, one or more local area networks (LANs) and/or wide area networks (WANs), as more fully discussed above. Such networking environments are commonplace in offices, enterprise-wide computer networks, intranets, and the Internet.

The network location 201 and the extended location 203 are generally configured to store resources 204 that may be aggregated within a collection of items, discussed above. In various embodiments, the network location 201 and the extended location 203 may be configured to be searchable for suitable access to the stored resources 204. For instance, the network location 201 may be searchable for digital audio files (i.e., resources 200) that are included in a collection of items within the scope of the library, from the example above.

It will be understood and appreciated by those of ordinary skill in the art that the resources 200 stored in the network location 201 and the extended location 203 may be configurable and may include any information relevant to the facilitating access thereof. The content and volume of such resources 200 or information are not intended to limit the scope of embodiments of the present invention in any way. Further, though illustrated as a single, independent components, the network location 201 and the extended location 203 may, in fact, be a remote server, a personal computing device (e.g., computing device 100 of FIG. 1), a handheld device (e.g., personal digital assistant), a mobile device (e.g., laptop computer, cell phone, media player), consumer electronic device, a plurality of databases, for instance, a database cluster, portions of which may reside on a computing device 215, another external computing device (not shown), and/or any combination thereof.

In yet another instance, the operating system 220 of the computing device 215 may be operably coupled to a local location 202 via a hardware connection or any other manner of placing internal components in communication with each other that is known in the relevant industry. Similar to the locations 201 and 203, the local location 204 is capable of storing, being searchable for, and providing suitable access to, the resources 204 that are added to the scope of the library. By way of example, the local location 204 may be a CD drive, a memory store, a database integrated with the operating system, a flash drive, expanded memory, a card, or any other media-storage element that can communicate with the operating system 220 when in proximity thereof.

Exemplary system architecture 200 includes the computing device 215 for, in part, supporting operation of the processing component 225. The computing device 215 may take the form of various types of computing devices. By way of example only, the computing device 215 may be a personal computing device (e.g., computing device 100 of FIG. 1), handheld device (e.g., personal digital assistant), a mobile device (e.g., laptop computer, cell phone, media player), consumer electronic device, various servers, and the like. Additionally, the computing device 215 may comprise two or more electronic devices configured to share information therebetween.

In embodiments, as discussed above, the computing device 215 includes the presentation component 250 and the processing component 225 (e.g., hardware) with an operating system 220 installed thereon. The computing device 215 is configured to render a UI display 251 on the presentation component 250. The presentation component 250, which may be operably coupled to the processing component 225, may be configured as any display device that is capable of presenting information to a user, such as a monitor, electronic display panel, touch-screen, liquid crystal display (LCD), plasma screen, one or more light-emitting diodes (LED), incandescent bulbs, a laser, an electroluminescent light source, a chemical light, a flexible light wire, and/or fluorescent light, or any other display type, or may comprise a reflective surface upon which the visual information is projected. In one exemplary embodiment, the UI display 251 rendered by the presentation component 250 is configured to present a top view 252 for surfacing a representation of one or more of the resources 204 within a scope of the library. In another exemplary embodiment, the UI display 251 is capable of rendering an indication whether sharing the resources 204 with a selected set of users was successful.

The operating system (OS) 220 refers generally to the software that manages the sharing of the resources of the processing component and provides programmers with an interface used to access those resources. In operation, the operating system 220 interprets system data and detects the user-initiated inputs, and responds by executing such processes as the following, in no particular order: launching a library that surfaces representations of the resources 204 at the UI display 251 (e.g., rendered within the top view 252), and contemporaneously manipulating properties of the resources 204 residing at target locations (e.g., the locations 201, 202, and 203). For discussion purposes, targeted locations, or scoped locations, generally refer to those locations that are included within the scope of the library. That is, the resources 200 stored at the target locations (e.g., one or more of the locations 201, 202, or 203) are mapped to the collection of items encompassed by the library. An untargeted location may be subsequently added to the scope of the library; however, the resources 204 saved to the untargeted location will likely be automatically manipulated such the properties of those resources 204 align with a current library-configuration state, discussed more fully below.

Further, the resources 204 stored at the targeted locations, which are verified as presently accessible to the operating system 220, are typically candidates for manipulation upon receiving the user-initiated action. In one instance, verifying includes ascertaining whether a framework of the library is operably coupled to one or more of the target locations. By way of example, if an intranet connection is functional and a CD is inserted at a CD driver, then the resources 204 at the extended location 203 and the local location 202, respectively, are accessible and candidates for being concurrently acted upon.

But, the resources 204 stored at the targeted locations, which are identified as not presently accessible to the operating system 220, are filtered from being candidates for manipulation upon receiving the user-initiated action. In one instance, those targeted locations that are unavailable to, or decoupled from, the framework of the library are filtered from being considered a candidate for manipulation applied to its contents. In another instance, upon recognizing that a user-initiated action is attempting to invoke a manipulation to the resources 204 within the collection of items, an application programming interface (API) may return a list of the target locations (e.g., an inventory of disconnected system paths) on which the operating system 220 can operate—via appropriate channels. By way of example, if an intranet connection is failing, the computing device 215 is offline from the Internet, and a CD is absent from a CD driver, then the resources 204 at the extended location 203 (e.g., an internally networked computer), the network location 201 (e.g., a photo sharing website), and the local location 202, respectively, are filtered from being candidates of an action triggered from the library.

Although various different configurations of the locations 201, 202, and 203 have been described above, it should be understood and appreciated by those of ordinary skill in the art that other types of suitable components that provide an accessible destination that, at least temporarily, retains data may be used, and that embodiments of the present invention are not limited to those particular locations described herein. For instance, the extended location 203 may include personal handheld device operable coupled to the computing device via a peer-to-peer wireless connection, while the local location 202 may include a standalone hard-drive that is operably coupled to the operating system 220 via a Bluetooth™ connection.

In an exemplary embodiment, the operating system 220 is accommodated on the processing component 225 and supports execution of one or more components for contemporaneously manipulating the resources 204 that are accessible to the library. With continued reference to FIG. 2, the components include a translation component 230, a sharing engine 235, a filtration component 245, an operation component 250, a presentation component 255, and a data store 260. Initially, the sharing engine 235 is generally configured to execute a handler scheme 240 for calling the plurality of target locations within a scope of the library upon launching the library. Calling may be invoked automatically in response to a trigger event (e.g., detecting the user-initiated operation to manipulate the library), or at periodic intervals (e.g., once a minute during regular operation). Typically, the launch of the library is invoked by a single user-initiated operation applied to a representation of the library at the UI display 251. For instance, the single user-initiated operation may be a mouse click applied over an iconic representation of the library revealed on a toolbar, a menu, a desktop workspace, and the like.

In one embodiment, the handler scheme 240 employs an API to interrogate the data store 260 to determine the various targeted locations, and resources therein, that are spanned by the library. Generally, the data store 260 is configured for receiving the calls from the handler scheme 240. In embodiments, the data store may include a registry, an XML file, or any other mechanism configured for holding and managing data. Upon recognizing that a call is received, the data store 260 may interpret the call(s) to identify one or more target locations at a local physical location (e.g., the local location 202) that are identified by the calls. In an exemplary embodiment, the handler scheme 240 appends a library identifier to the calls to facilitate the identification of the appropriate local physical locations. Also, the data store 260 may generate a manifest of system paths 270 that relate to the resources 204 within the scope of the library. That is, the system paths point to the resources 204 residing within the identified target locations.

The translation component 230 is generally configured for receiving the calls from the handler scheme 230 and interpreting the calls to identify one or more target locations at remote physical location(s) (e.g., the network location 201 and/or the extended location 203) that are identified by the calls. In embodiments, the translation component 230 is responsible for translating a list of one or more resources residing at the identified target locations into a manifest of system paths 265. These manifests of system paths 265 and 270 may be retrieved by the handler scheme 240 and aggregated to a listing of system paths at the sharing engine 235. This aggregated list of system paths allows the operating system 220 to target the appropriate resources for implementing contemporaneous manipulation thereto.

A used herein, the phrase "system paths" is not meant to be limiting but may encompass any format that targets one or more resources. In one instance, a system path may include a mapping scheme that locates the resource on a particular device. In another instance, the system path may link one or more scoped resources to the library via namespace identifiers. By way of example, the namespace identifiers include an abstract container that provides a unique context for navigating to a particular resource residing at the resources 204 within the library's scope.

The filtration component is generally configured to filter the system paths from the manifests 265 and 270 upon ascertaining that one or more of the target locations is currently unavailable to the sharing engine 235. As such, the filtered system paths point to one or more resources residing at unavailable target locations. As discussed above, the unavailable target locations may include remote servers that are, for some reason, decoupled from the computing device 215. By way of example, the unavailable target locations includes one or more of the following: a secure server protected with user-specific authorization data, a data store that is disconnected from the operating system, or the remote physical location that is currently inaccessible.

Accordingly, the available locations may be considered candidates for concurrently manipulating the resources therein. These "targeted resources" may be accessed by tracing the system paths thereto. In one embodiment, each of the targeted resources is concurrently manipulated upon detecting an appropriate user-initiated operation. In other embodiments, the user may select one or more of the targeted resources for concurrent manipulation from listing of the targeted resources.

The operation component 250 is generally configured for automatically manipulating the interactive rights of the resources 204 in substantial concurrence. Typically the functionality of the operation component 250 is initiated by detecting a user-initiated operation applied to the library. In one instance, the user-initiated operation is a selection at a visual representation (e.g., icon or control button) of the library surfaced at the UI display 215. In particular embodiments, applying the user-initiated operation at the representation of the library includes providing an instruction to alter rights to the resources, and/or providing a selection of users whose rights, with respect to the resources, are affected upon manipulating the properties of the resources. Generally, selecting a set of users involves picking one or more users or user-groups from a list. Accordingly, the resources may be shared/unshared with the selected users concurrently by applying the appropriate user-initiated operation to the library. By way of example, the resources may be shared to the selected set of users by inserting expected identifiers that are associated with each selected user, respectively, within the instruction to alter resource rights.

By way of example, providing an instruction to alter rights to the resources may include employing the sharing engine 235 to perform an action on the properties of the targeted resources by tracing the system paths thereto. Further, providing an instruction to alter rights to the resources may include simultaneously manipulating the properties of the targeted resources such that the targeted resources are shared (e.g., lifting the protective rights) or unshared (e.g., applying security measures to the resources 204). Further yet, providing an instruction to alter rights to the resources may include contemporaneously performing any other operation on the targeted resources that is known in the relevant field. By way of example only, contemporaneously performing other operations may include, inter alia, the following actions: sharing/unsharing a selection of the resources, backing-up the resources, encrypting the resources, or syncing the resources when connected with a suitable device. Typically, the resources are, at least temporarily, stored.

In embodiments, library-configuration state is updated to reflect one or more of these operations performed upon the resources. Generally, the library-configuration state is a storage mechanism that captures qualities of the resources upon manipulating the properties thereof. As such, upon adding a new resource or location to the existing scope of the library, the properties of this new item may be aligned with the library-configuration state. For instance, if the operating system 220 recognizes that the scope of the library is extended to encompass a subject resource residing within an untargeted location, the properties of the newly added subject resource are automatically manipulating to align with the library-configuration state. By way of example, when the library-configuration state indicates that each of the resources stored at target locations within the scope of the library are currently being shared to a particular group, then upon entry to the scope of the library, a subject resource may be automatically manipulated such that it is similarly shared. In another example, when the library-configuration state indicates that each of the resources stored at target locations within the scope of the library are currently marked as private, then upon entry to the scope of the library, a shared subject resource may be automatically manipulated such that it is marked as private as well. Conversely, in embodiments, if a constriction of the scope of the library to exclude a subject resource residing within a targeted location is recognized, the properties of the subject resource are automatically manipulated to align with a restored-configuration state. In one instance, the restored-configuration state of the subject resource is influenced by default configuration settings of the operating system 220.

The presentation component 255 is generally configured for alerting a user that the simultaneous manipulation of the protective rights of the resources is successful or unsuccessful. In embodiments, providing an alert of an unsuccessful attempt to manipulate includes surfacing an error message indicating the unavailable target locations. The issuing of notifications is discussed more fully below with reference to FIGS. 9 and 10. In instances, the presentation component 255 may be responsible for surfacing the top view 252 at the UI display 251, as depicted by communication 275. Also, in instances, the presentation component 255 may communicate a status of rights, with respect to the manipulated resources, to the selected set of users who are affected by the manipulation.

With reference to FIG. 2, this exemplary system architecture 200 is but one example of a suitable environment that may be implemented to carry out aspects of the present invention and is not intended to suggest any limitation as to the scope of use or functionality of the invention. Neither should the illustrated exemplary system architecture 200 be interpreted as having any dependency or requirement relating to any one or combination of the components 230, 235, 245, 250, 255, and 260 as illustrated. In some embodiments, one or more of the components 230, 235, 245, 250, 255, and 260 may be implemented as stand-alone devices. In other embodiments, one or more of the components 230, 235, 245, 250, 255, and 260 may be integrated directly into the operating system 220, and thus not distinct therefrom. It will be understood by those of ordinary skill in the art that the components 230, 235, 245, 250, 255, and 260 illustrated in FIG. 2 are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components/elements is not so clear, and metaphorically, the lines would more accurately be grey or fuzzy. Further, although some components and devices of FIG. 2 are depicted as single blocks, the depictions are exemplary in nature and in number and are not to be construed as limiting (e.g., although only one presentation component 255 is shown, many more may be operably coupled to the computing device 215, thereby functioning in conjunction to present the UI display 215).

Figure 3:
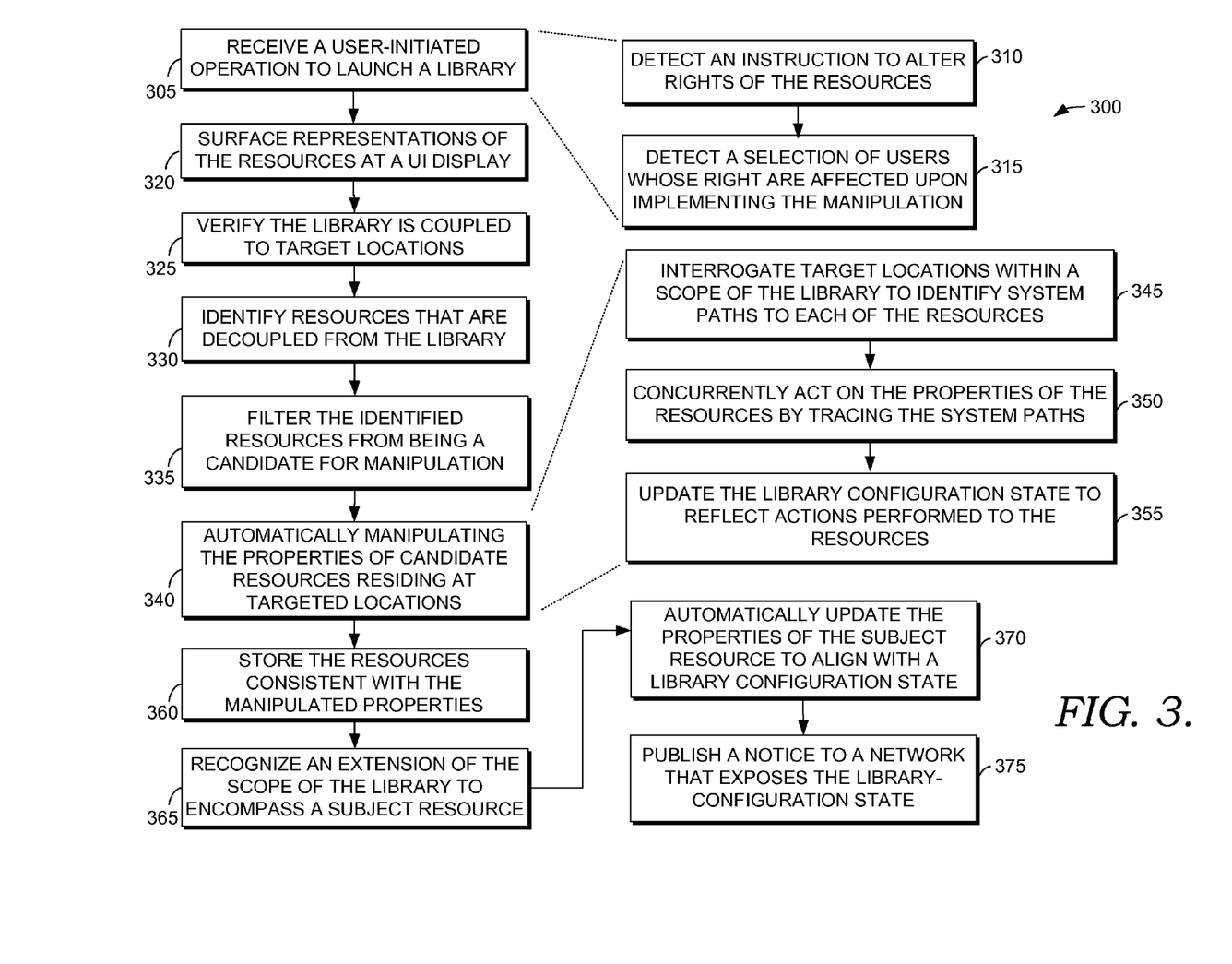
FIG. 3 is a flow diagram illustrating an overall method for automatically manipulating properties of resources residing at one or more locations targeted by a library, in accordance with an embodiment of the present invention.

Exemplary processes for contemporaneously manipulating resources within the scope of the library will now be described with reference to FIGS. 3 and 4. Initially, FIG. 3 is a flow diagram that illustrates an overall method 300 for automatically manipulating properties of resources residing at one or more locations targeted by a library, in accordance with an embodiment of the present invention. As depicted at block 305 a user-initiated operation to launch a library is received. As discussed above, in embodiments, the library includes a framework for contemporaneously accessing the resources of the one or more targeted locations within a scope of the library. In one instance of the framework, a shell-link is provided that points to various resources on targeted locations. The shell-link may be partially based on a list of system paths for the resources within the library's scope, which are typically gathered by the handler scheme 240 of FIG. 2.

In one instance, receiving the user-initiated action applied at the surfaced representation includes, at least, the following steps: detecting an instruction to alter rights to the resources (see block 310), and detecting a selection of users, whose rights with respect to the resources are affected upon implementing the manipulation to the properties of the resources. Further, as discussed above, the user-initiated operation may be applied to a representation of the library, via a menu, or a representation of an item (e.g., an icon describing a resource, a location, a file, a document, a folder, and the like) in the collection of the library. As such, one, a selection, or all of the resources within the scope of the library may be indicated for having the manipulation applied thereto.

Incident to launching the library, representations of the resources are surfaced at a UI display, as indicated at block 320. In embodiments, surfacing representations of the resources at a UI display (e.g., the UI display 251 rendered at the presentation device 250 of FIG. 2) includes, inter alia, rendering a collective view of the resources in a hierarchical format. By way of example, the hierarchical format is intuitively navigable to discover an individual resource stored at a particular targeted location. Accordingly, the hierarchical format is searchable for the individual resources by exploring content associated with the resources within the scope of the library.

As indicated at block 325, the method 300 may further include verifying that framework of the library is operably coupled to each of the target locations. In embodiments, verifying that framework of the library is operably coupled to the target locations includes, in no particular order, identifying as unavailable the resources that reside at targeted locations that are decoupled from the framework (see block 330), and filtering the identified resources from being considered a candidate for automatic manipulation (see block 335).

A user-initiated action applied to one of the surfaced representations may be received. In accordance with the user-initiated action, the properties of each of the resources residing at the targeted locations, within the scope of the library, are automatically manipulated, as indicated at block 340. In instances, automatically manipulating the properties of each of the resources includes, but is not limited to, the following steps: interrogating the targeted locations within the scope of the library to identify system paths to each of the resources residing therein (see block 345), and concurrently acting on the properties of the resources by tracing the system paths thereto (see block 350). Also, in instances, automatically manipulating the properties of each of the resources may include performing at least one of the following operations: sharing the resources, regularly backing-up the resources, encrypting the resources, or syncing the resources upon detecting a connection with a suitable device. In an exemplary embodiment, a library-configuration state is updated to reflect these operations performed upon the resources, as indicated at block 355.

The resources may be stored consistently with the manipulated properties, as indicated at block 360. In embodiments, storing the resources consistent with the manipulated properties includes updating the library-configuration state. As discussed above, the library configuration state captures qualities of the resources upon manipulating the properties thereof. As indicated at block 365, an extension of the scope of the library to encompass a subject resource residing within an untargeted location may be recognized. Incident to recognizing an entry of the subject resource, the properties of the subject resource are automatically manipulating to align with the library-configuration state, as indicated at block 370. Accordingly, the library-configuration state of the subject resource is consistent with a latest manipulation applied to the resources originally provided within the scope of the library. As indicated at block 375, a notice is published that exposes the updated library-configuration state of the resources upon manipulating the properties thereof. In addition, an indication of whether the manipulation is successfully applied to the properties of each of the resources may be surfaced.

Figure 4:
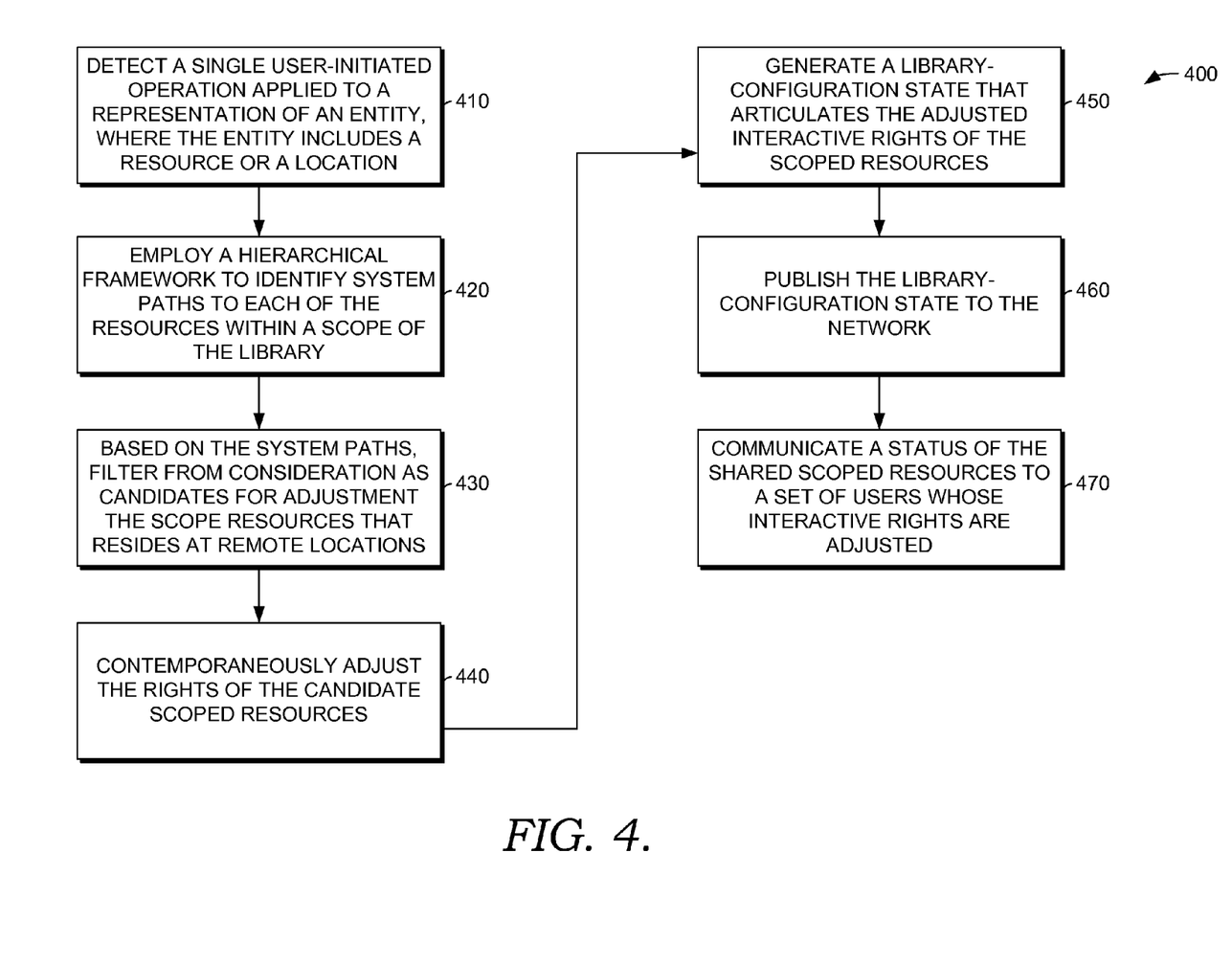
FIG. 4 is a flow diagram illustrating an overall method for contemporaneously adjusting interactive rights of one or more resources, in accordance with an embodiment of the present invention.
Figure 5:
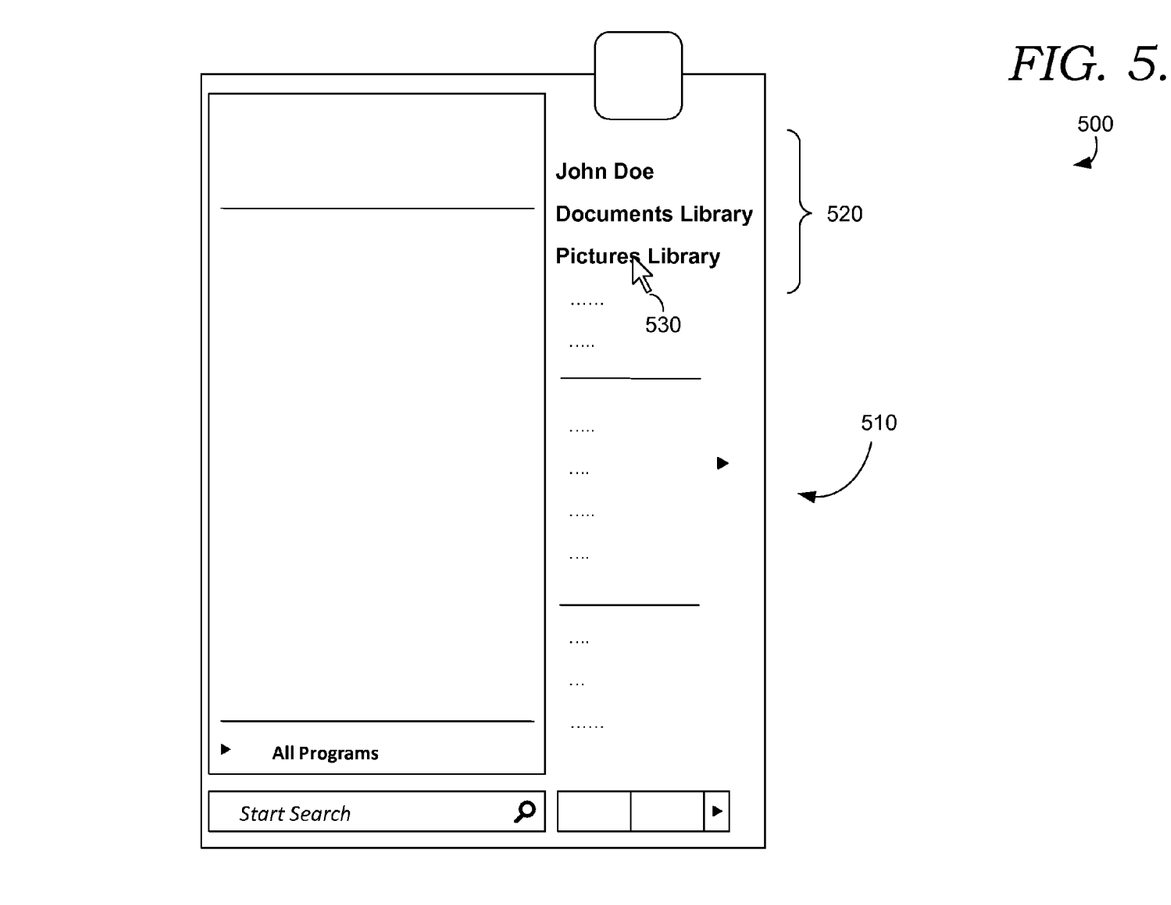
FIGS. 5-10 are illustrative screen displays of exemplary user interfaces for accessing a library and surfacing a representation of the collection of items within the library, in accordance with an embodiment of the present invention.

Turning to FIG. 4, a flow diagram that illustrates an overall method 400 for contemporaneously adjusting interactive rights of one or more resources is shown, in accordance with an embodiment of the present invention. Initially, a single user-initiated operation applied to a representation of an item is detected, as indicated at block 410. Generally, the item includes a location or the resources residing at the location that is encompassed within a scope of a library. As discussed above, the library comprises a framework for contemporaneously accessing and acting on the scoped resources. As indicated at block 420, the framework of the library is employed to identify system paths to each of the scoped resources. Based on the system paths, the scoped resources that reside at remote locations are filtered from consideration as candidates for adjustment, as indicated a block 430. As indicated at block 440, the interactive rights of the candidate scoped resources are contemporaneously adjusted (e.g., sharing or unsharing the resources). A library-configuration state that articulates the adjusted interactive rights of the scoped resources may be generated. In embodiments, the library-configuration state to may be published to a network, as indicated at block 460. Further, as indicated at block 470, a status of the shared scoped resources may be communicated to the set of users whose interactive rights to the scoped resources are adjusted.

With reference to FIGS. 5-10, illustrative screen displays of exemplary user interfaces for accessing a library and surfacing a representation of the collection of items within the library are shown, in accordance with an embodiment of the present invention. Initially, with reference to FIG. 5, an illustrative screen display 500 depicts a menu window 510 (e.g., a start menu) that includes a plurality of selectable links 520. Applying a user-initiated action 530 (e.g., a single mouse click) on the selectable links 520 may invoke the operating system to launch a library identified by the user-initiated action 530. Although a particular configuration of the selectable links 520 has been described, it should be understood and appreciated by those of ordinary skill in the art that other types of suitable configurations (e.g., control buttons, selectable portions of a toolbar, drop-down menu) that induce launching a library may be used, and that embodiments of the present invention are not limited to the configuration described herein.

Figure 6:
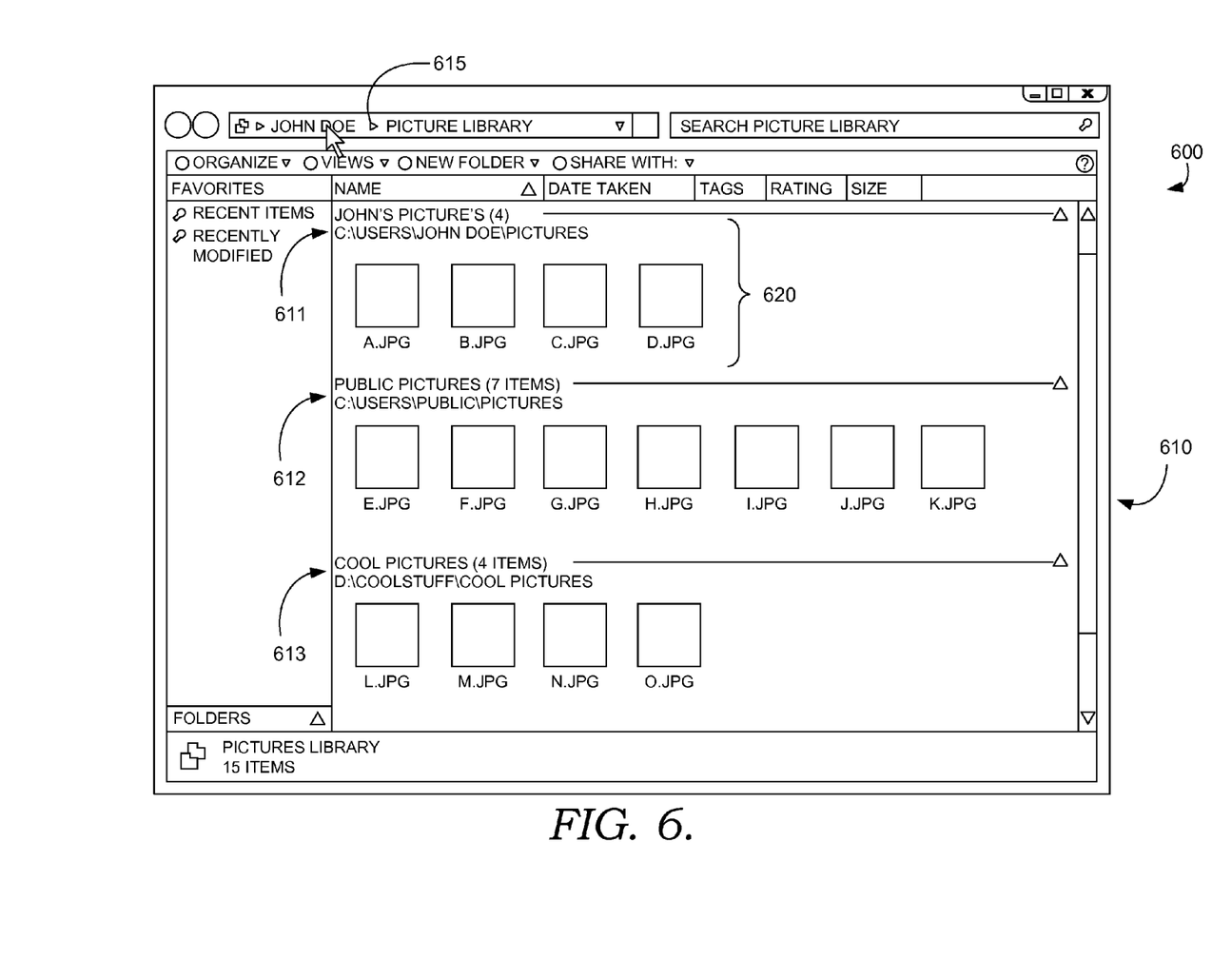

Turning to FIG. 6, an illustrative screen display 600 depicts a top view 610 (e.g., the top view 252 surfaced at the user-interface 251 of FIG. 2) that exposes a collection of items within a pictures library 615. In particular, the collection of items includes locations 611, 612, and 513 that are targeted by the pictures library 615. In one of the targeted locations 611, which is a local location on a hard drive within the scope of the pictures library 615, resources 620 (e.g., digital image files) residing at that location 611 are exposed by rendering representations thereof. These representations may include an icon, an alphanumeric label, a top-level menu, or any other manner of indicating a resource to user know in the relevant field.

Figure 7:
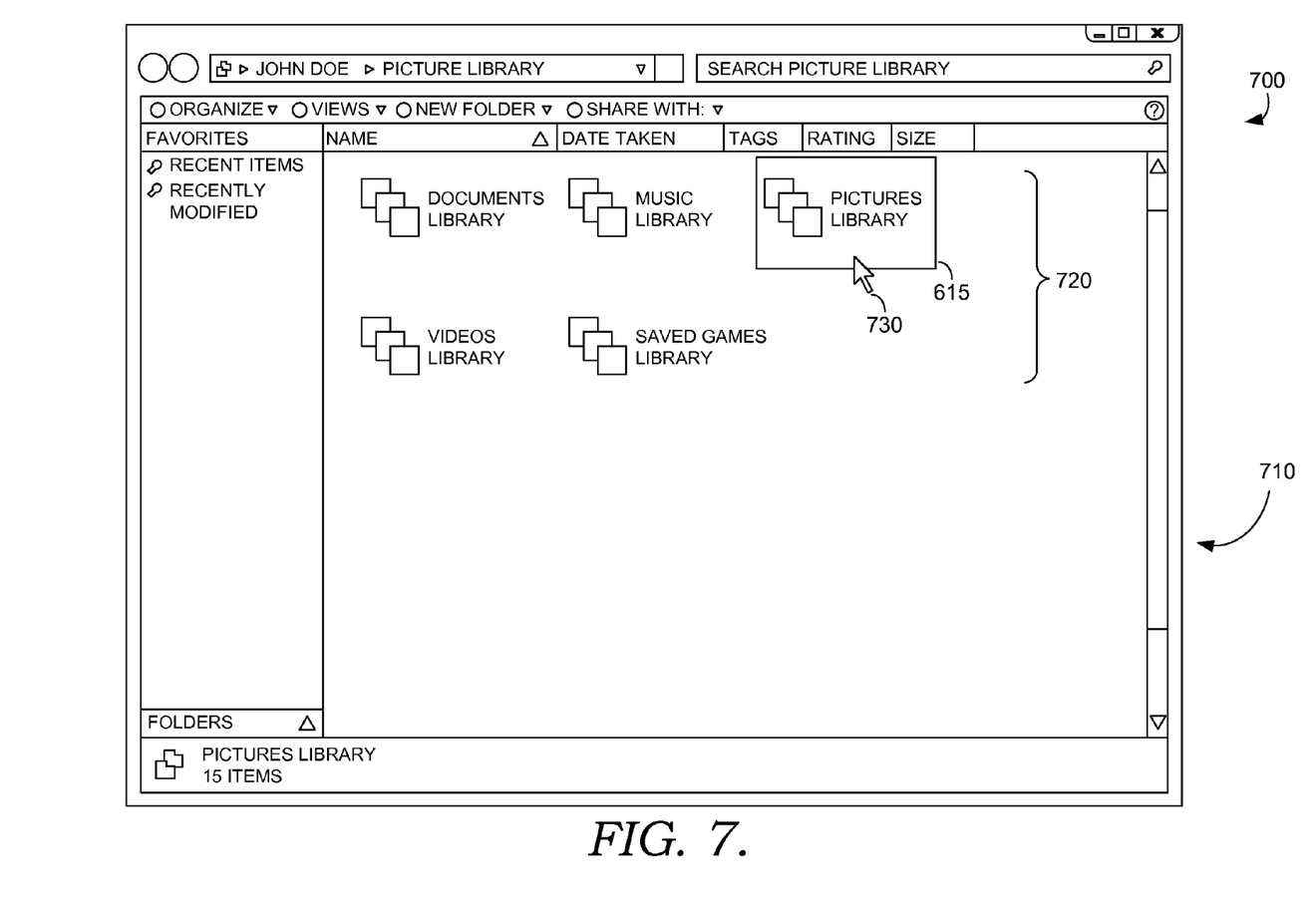

With reference to FIG. 7, an illustrative screen display 700 depicts a display area 710, or window, that includes a listing of libraries 720. As shown, the pictures library 615 of FIG. 6 is selected for performing a manipulation thereto. The selection is conducted by way of a user-initiated operation 730, as discussed above. Accordingly, the user-initiated operation 730 may be applied to a representation of a resource (e.g., see FIG. 6 at reference numeral 620) or to a representation of a library, such as the picture library 615. Based on which representation is selected, one, a group, or all of the resources within the picture library 615 may be contemporaneously manipulated.

Figure 8:
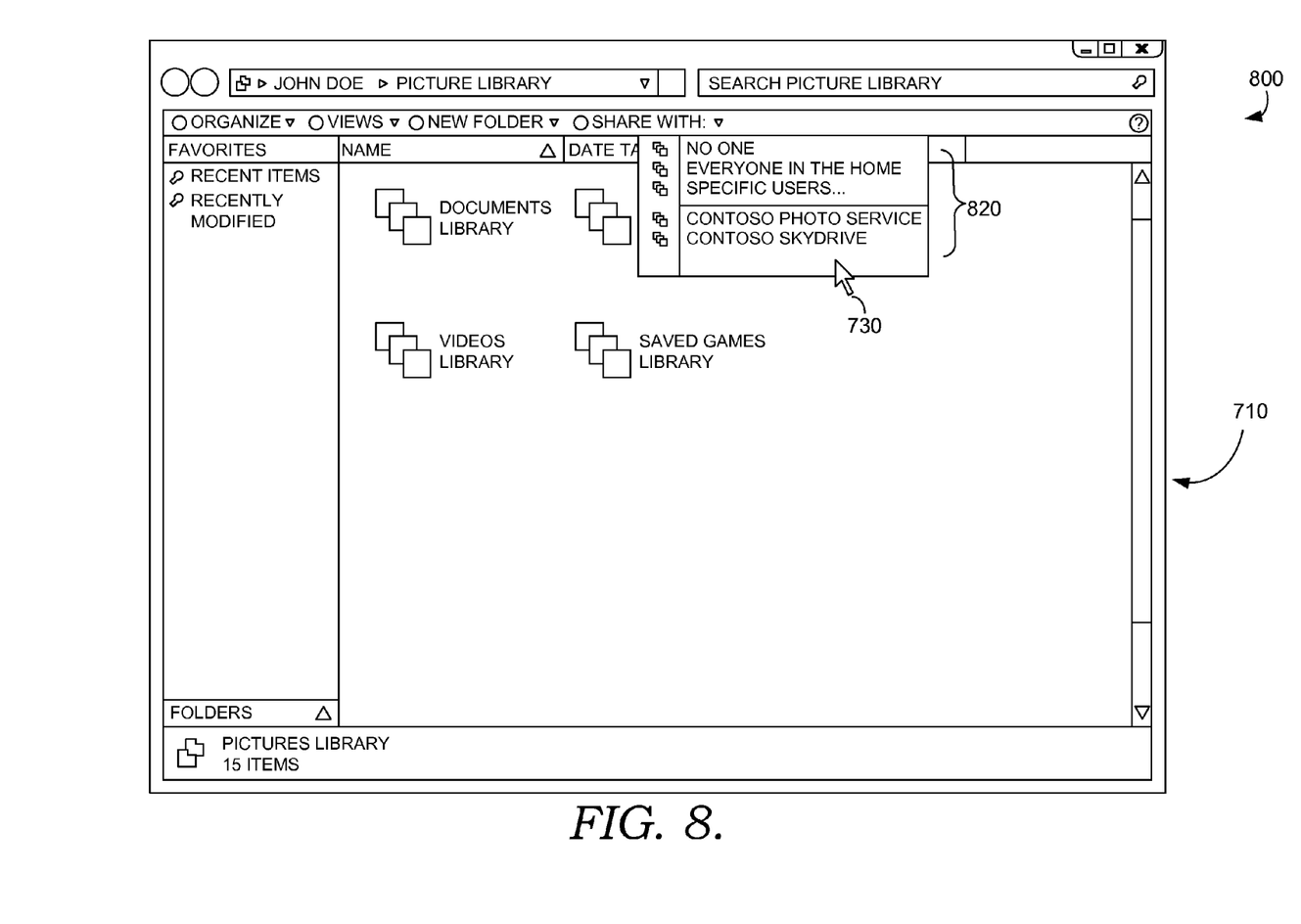

Turning to FIG. 8, an illustrative screen display 800 depicts a display area 710, or window, that includes a listing of libraries. In embodiments of the user-initiated operation 730, set of users 820 may be selected. Typically, the rights of the selected set of users may be altered upon contemporaneously manipulating the resources within the scope of the pictures library. By way of example, specific users may be identified and aggregated into a set of users, who will gain rights to the digital image files within the scope of the pictures library, as part of the user-initiated operation.

Figure 9:
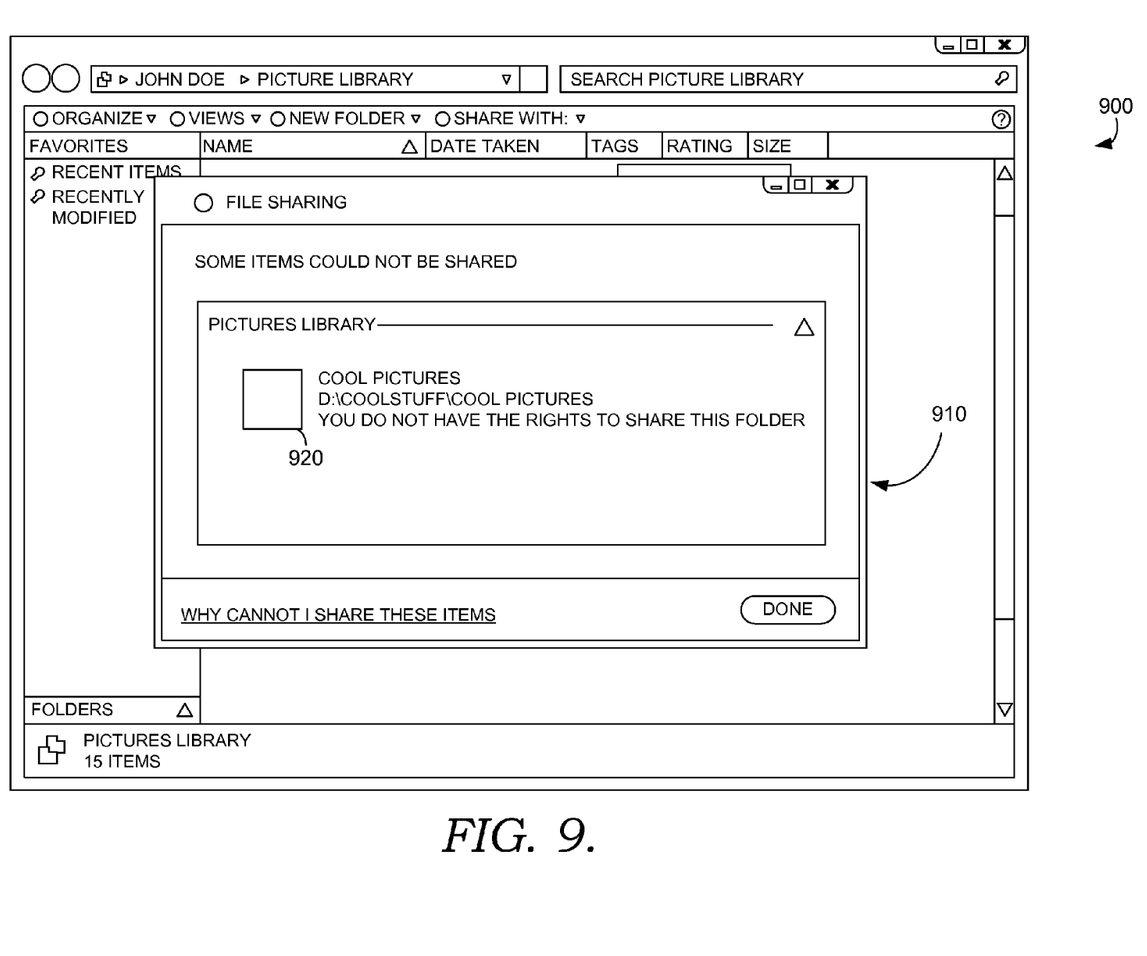
Figure 10:
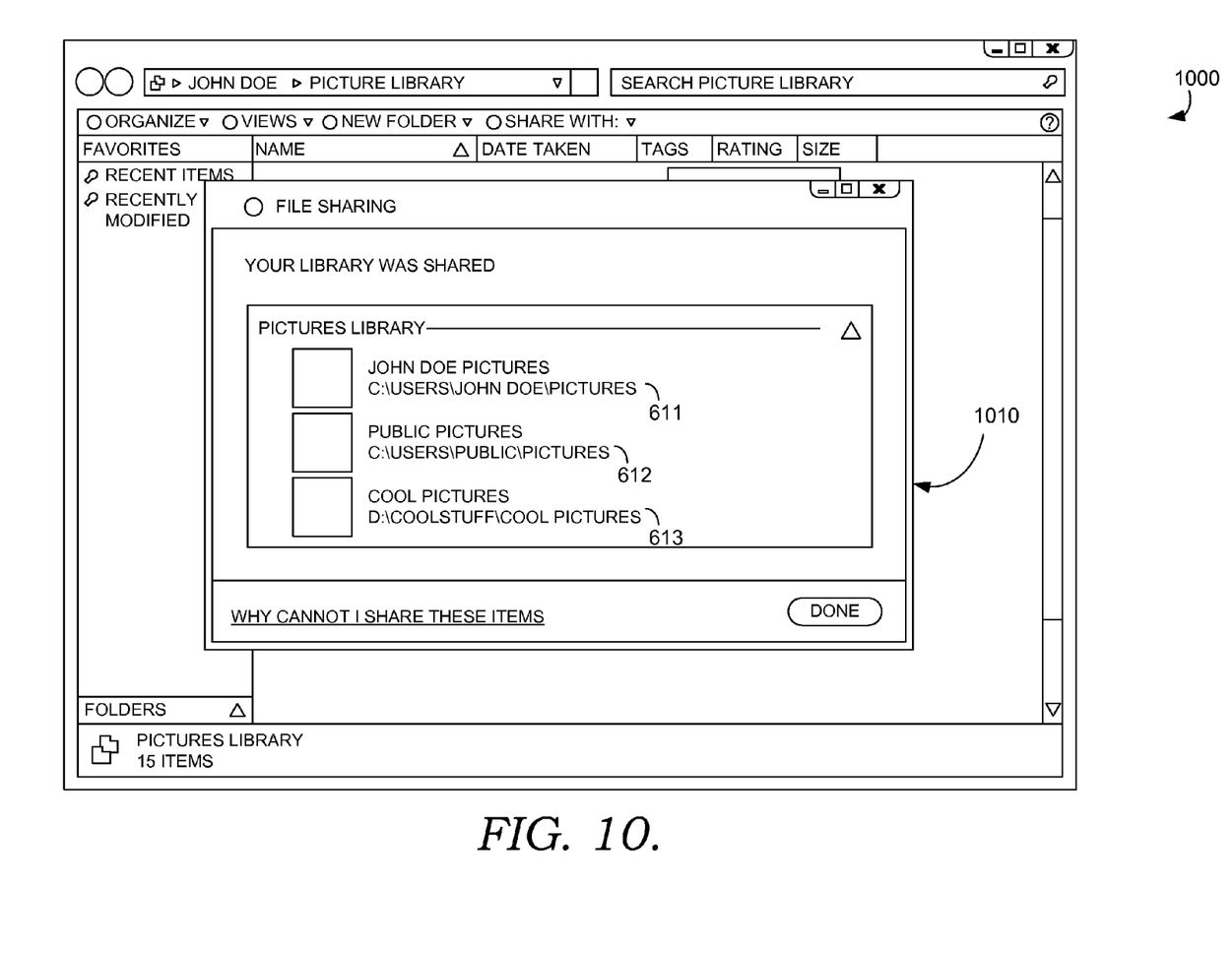

Turning now to FIG. 9, an illustrative screen display 900 depicts an indication 910, or window, that alerts a user whether the resources selected for sharing, unsharing, or any other type of manipulation, were successfully contemporaneously manipulated. As shown, a targeted location 920 that has digital image files stored thereon is identified as not being available for sharing. The target location may be unavailable for a variety of reasons, as discussed above, including being operably decoupled from the operating system. If the manipulation is successful, a indication 1010 is surfaced alerting a user that the selected resources are shared, unshared, or otherwise acted on in a contemporaneous manner. This indication 1010 is depicted at an illustrative screen display 1000 of FIG. 10. In embodiments, the indication includes a message that communications each of the targeted locations 611, 612, and 613 that affected by the manipulation.

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer-readable media having computer-executable instructions embodied thereon that, when executed, perform a method for automatically manipulating properties of resources residing at one or more locations targeted by a library, the method comprising:
   receiving a user-initiated operation to launch a library, wherein the library comprises a framework for contemporaneously accessing the resources of the one or more targeted locations within a scope of the library;
   incident to launching the library, surfacing representations of the resources at a UI display;
   receiving a user-initiated action applied to one of the surfaced representations;
   in accordance with the user-initiated action, automatically manipulating the properties of each of the resources residing at the one or more targeted locations within the scope of the library;
   at least temporarily storing the resources consistent with the manipulated properties, wherein storing comprises updating a library-configuration state that captures qualities of the resources upon manipulating the properties thereof;
   recognizing an extension of the scope of the library to encompass a subject resource residing within an untargeted location; and
   incident to recognizing an entry of the subject resource, automatically manipulating properties of the subject resource to align with the library-configuration state, wherein the library-configuration state of the subject resource is consistent with a latest manipulation applied to the resources originally provided within the scope of the library.

2. The one or more computer-readable media of claim 1, wherein the method further comprising:
   recognizing a constriction of the scope of the library to exclude a subject resource residing within a targeted location of the one or more targeted locations; and
   incident to recognizing a withdrawal of the subject resource, automatically manipulating properties of the subject resource to align with a restored-configuration state, wherein the restored-configuration state of the subject resource is influenced by default configuration settings of an operating system.

3. The one or more computer-readable media of claim 1, wherein the method further comprises publishing a notice to a network that exposes the updated library-configuration state of the resources upon manipulating the properties thereof.

4. The one or more computer-readable media of claim 1, wherein receiving a user-initiated action applied at the surfaced representation comprises:
   detecting an instruction to alter rights to the resources; and
   detecting a selection of users whose rights with respect to the resources are affected upon implementing the manipulation to the properties of the resources.

5. The one or more computer-readable media of claim 1, wherein surfacing representations of the resources at a UI display comprises rendering a collective view of the resources in a hierarchical format, wherein the hierarchical format is intuitively navigable for an individual resource stored at a particular targeted location of the one or more target locations, and wherein the hierarchical format is searchable for the individual resources by exploring content associated with the resources within the scope of the library.

6. The one or more computer-readable media of claim 1, wherein the method further comprises verifying that framework of the library is operably coupled to each of the one or more target locations.

7. The one or more computer-readable media of claim 6, wherein verifying that framework of the library is operably coupled to each of the one or more target locations comprises:
   identifying as unavailable the resources that reside at targeted locations, of the one or more target locations, that are decoupled from the framework, and
   filtering the identified resources from being considered a candidate for automatic manipulation.

8. The one or more computer-readable media of claim 1, wherein automatically manipulating the properties of each of the resources comprises:

interrogating the one or more targeted locations within the scope of the library to identify system paths to each of the resources residing therein; and concurrently acting on the properties of the resources by tracing the system paths thereto.

9. The one or more computer-readable media of claim 1, wherein the method further comprises surfacing an indication of whether the manipulation is successfully applied to the properties of each of the one or more resources.

10. The one or more computer-readable media of claim 1, wherein automatically manipulating the properties of each of the resources comprises:

performing at least one of the following operations: sharing the resources, regularly backing-up the resources, encrypting the resources, or syncing the resources upon detecting a connection with a suitable device; and updating a library-configuration state to reflect the operations performed upon the resources.

11. One or more computer-readable media having computer-executable instructions embodied thereon that, when executed, perform a method for automatically manipulating properties of resources residing at one or more locations targeted by a library, the method comprising:

receiving a user-initiated operation to launch a library, wherein the library comprises a framework for contemporaneously accessing the resources of the one or more targeted locations within a scope of the library;

incident to launching the library, surfacing representations of the resources at a UI display;

receiving a user-initiated action applied to one of the surfaced representations;

in accordance with the user-initiated action, automatically manipulating the properties of each of the resources residing at the one or more targeted locations within the scope of the library;

at least temporarily storing the resources consistent with the manipulated properties, wherein storing comprises updating a library-configuration state that captures qualities of the resources upon manipulating the properties thereof;

recognizing a constriction of the scope of the library to exclude a subject resource residing within a targeted location of the one or more targeted locations; and incident to recognizing a withdrawal of the subject resource, automatically manipulating properties of the subject resource to align with a restored-configuration state, wherein the restored-configuration state of the subject resource is influenced by default configuration settings of an operating system.

12. The one or more computer-readable media of claim 11, wherein the method further comprises publishing a notice to a network that exposes the updated library-configuration state of the resources upon manipulating the properties thereof.

13. The one or more computer-readable media of claim 11, wherein receiving a user-initiated action applied at the surfaced representation comprises:

detecting an instruction to alter rights to the resources; and detecting a selection of users whose rights with respect to the resources are affected upon implementing the manipulation to the properties of the resources.

14. The one or more computer-readable media of claim 11, wherein surfacing representations of the resources at a UI display comprises rendering a collective view of the resources in a hierarchical format, wherein the hierarchical format is intuitively navigable for an individual resource stored at a particular targeted location of the one or more target locations, and wherein the hierarchical format is searchable for the individual resources by exploring content associated with the resources within the scope of the library.

15. The one or more computer-readable media of claim 11, wherein the method further comprises verifying that framework of the library is operably coupled to each of the one or more target locations.

16. The one or more computer-readable media of claim 15, wherein verifying that framework of the library is operably coupled to each of the one or more target locations comprises:

identifying as unavailable the resources that reside at targeted locations, of the one or more target locations, that are decoupled from the framework, and filtering the identified resources from being considered a candidate for automatic manipulation.

17. The one or more computer-readable media of claim 11, wherein automatically manipulating the properties of each of the resources comprises:

interrogating the one or more targeted locations within the scope of the library to identify system paths to each of the resources residing therein; and concurrently acting on the properties of the resources by tracing the system paths thereto.

18. The one or more computer-readable media of claim 11, wherein the method further comprises surfacing an indication of whether the manipulation is successfully applied to the properties of each of the one or more resources.

19. The one or more computer-readable media of claim 11, wherein automatically manipulating the properties of each of the resources comprises:

performing at least one of the following operations: sharing the resources, regularly backing-up the resources, encrypting the resources, or syncing the resources upon detecting a connection with a suitable device; and updating a library-configuration state to reflect the operations performed upon the resources.

\* \* \* \* \*